Dec. 9, 1924.
W. RAABE
1,518,703
LEACHING APPARATUS
Filed April 20, 1921
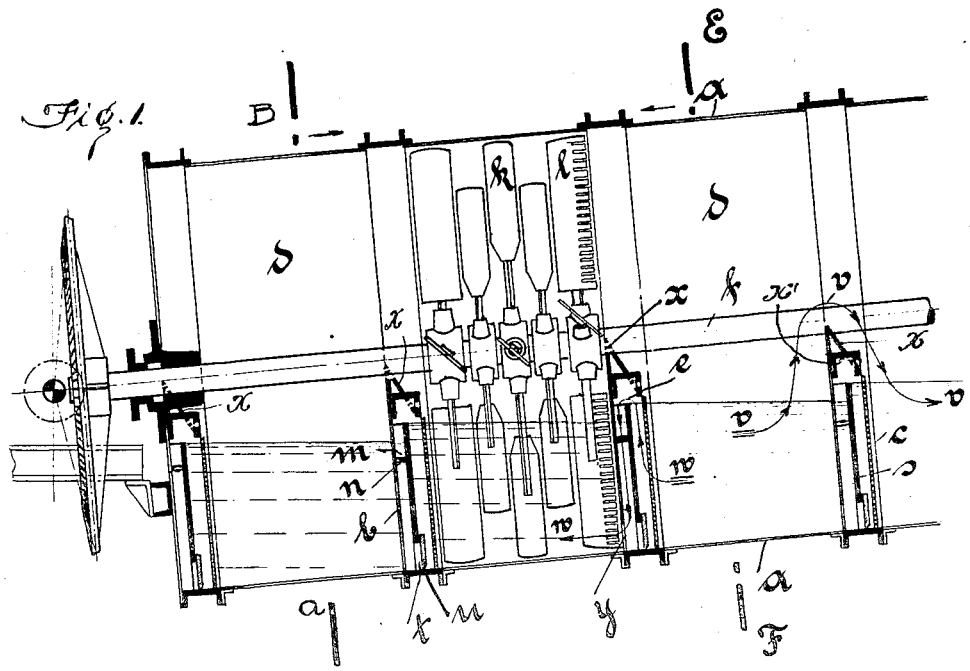
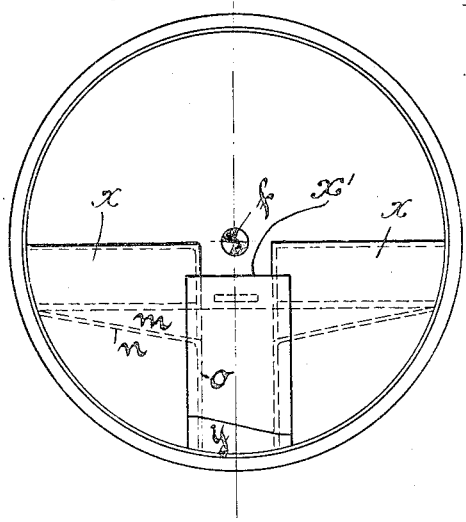
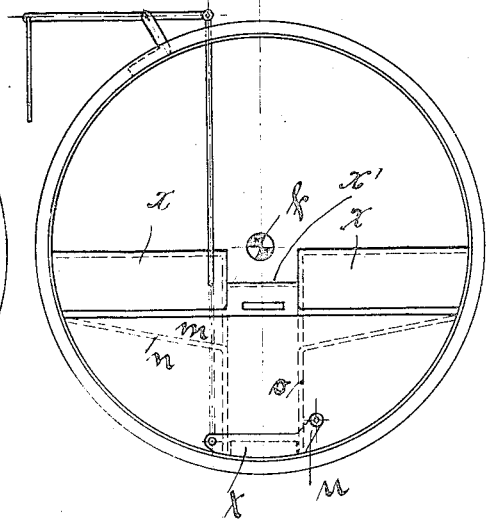
Inventor:
W. Raabe
By
Lawrence Langner
Attorney Patented Dec. 9, 1924.

1,518,703

UNITED STATES PATENT OFFICE.

WALTER RAABE, OF COTHEN, ANHALT, GERMANY.

LEACHING APPARATUS.

Application filed April 20, 1921. Serial No. 463,044.

*To all whom it may concern:*

Be it known that I, WALTER RAABE, engineer chemist, residing at Langestrasse 44, Cothen, Anhalt, in the German Republic, have invented certain new and useful Improvements in Leaching Apparatus (for which I have filed applications in Germany, No. 67,695, Dec. 16, 1919; Denmark, No. 3,628, Nov. 25, 1920; Sweden, No. 5,598, Nov. 30, 1920; Hungary, Nov. 27, 1920; Czechoslovakia, Dec. 3, 1920), of which the following is a specification.

My invention relates to an apparatus working on the counter-flow principle and serving for leaching, washing or similarly treating solid or half-solid material, more particularly, sacchariferous vegetable slices. In accordance with the apparatus described in Patent No. 1134152 dated April 6, 1915, the apparatus forming the subject matter of my invention is provided with separating chambers for the temporary separation of the material being treated and of the leaching liquid, and this by means of partitions.

In the case of the apparatus of this description as hitherto known, the working liquid flows into the separating chamber through a sieve or grid-shaped wall which is intended to prevent slices or the like from being taken along by the liquid in the course of its travel, and, in a similar manner, the liquid is discharged from the separating chamber through a sieve or grid-shaped wall.

However, experience has shown that a sieve or grid-shaped element of the said type continuously causes trouble by the slices or the like which are thrust forward from below by the conveying device against the sieve or grid-shaped wall settling or sticking in the more or less fine openings formed in the wall structure, clogging them up and thus impairing the efficiency of the entire process.

This defect is remedied in accordance with my present invention by the provision of a unique discharge opening or outlet of large cross-section in the place of a plurality of narrow apertures for the discharge of the liquid from the separating chamber. Experience has shown that contrary to expectation the slices are not thrust forward into this large outlet but that the leaching liquid coming from the opposite direction and the entire quantity of which after descending in a broad stream flows down the overflow partition, and is collected in the outlet part, will constitute such a powerful obstruction at this point as to prevent the slices from passing through.

In the drawing accompanying this specification and forming part thereof an apparatus embodying my invention is illustrated in a purely diagrammatic manner by way of illustration. In the drawing—

Fig. 1 is a longitudinal sectional view, parts being shown in elevation;

Fig. 2 is a section on line A—B of Fig. 1, looking toward the right, parts being shown in elevation;

Fig. 3 is a section on line E—F, of Fig. 1 looking toward the left, parts being shown in elevation.

Referring to these drawings, the inclined cylindrical trough $a$ is divided by partitions $b$ and $c$, leaving a part of its section free, into a plurality of leaching chambers $d$ and separating or reversing chambers $e$. These chambers are covered by a coping or roof $x$, having a rectangular depressed portion $x'$ at the center, to permit passage of the driving shaft $f$ which extends through the trough for its full length. The partitions $c$ are perforated, or constructed like a grid for their entire height, so that the leaching liquid coming from above will be enabled to enter the chambers $e$ across the entire area of the partitions $c$. Below the coping or roof $x$ within chamber $e$ there is located an overflow wall $s$, at the lower end of which there is arranged the cleaning door $t$ closed as a rule by means of slide gates $u$. These gates may be opened when required in order to afford the possibility of removing impurities, such as sand and the like, that may have become deposited at this point by washing them away.

The slices supplied at the lower end of the trough are conveyed upwards into the several chambers $d$ in the direction denoted by arrows $v$ by the conveyor arms $k$ fixed to shaft $f$ and disposed at a suitable pitch; these arms $k$ are shown for the sake of clarity only in the middle section of Fig. 1. By means of blades $l$ (which are likewise only shown at the middle of Fig. 1) and which are considerably larger than the conveyor arms $k$, the slices are thrown across the copings or roofs $x$ into the next chamber. There they are met by the leaching liquid, juice or water furnished at the upper end of the trough $a$. This said juice flows in the direction denoted by the arrows w through the grid-shaped partitions c into the reversing chambers e, is there dammed by the walls s, flows over these escaping at the lower end of chambers e into the working chamber immediately below, and thus in repetition through the alternatingly arranged leaching and separating chambers exactly as described in my previous patent No. 1,134,152.

My present invention distinguishes itself from the prior patent by the feature of the partition b being provided, instead of a plurality of minute apertures previously employed with a single large opening y, for the discharge of the liquid flowing over the wall s in a broad stream. As it is, the entire liquid is bound to flow through this said single opening and practical working has shown that the current of liquid is sufficiently powerful to prevent the entrance of slices into the separating chamber e through this opening.

The opening y is moreover not constructed on the simple lines of a rectangle, but rather in the form of a wedge. I have found that when such a shape is given to the opening y, any objectionable clogging of the slices in front of said opening is effectually obviated.

I have also found it exceptionally advantageous to avoid the formation of dead corners within the reversing or separating chambers e. To this end, the liquid flowing over the partition s is trapped by guide conduits m which serve to force and conduct it directly toward the outlet y. These said conduits have in the example illustrated, a U-shaped section and an inclined bottom n, adapted to tightly close up the space intermediate partitions b and s, and immediately contiguous with which and in line with the side edges of the opening y there are arranged the vertical partitions o. Hence, the liquid flowing in a broad stream over wall s is conducted by conduits m at a suitable fall and in a powerful jet across the inclined bottom n toward the centre of the apparatus thence to descend across partitions o and to escape in a powerful current through the discharge opening y.

What I claim is:—

1. Leaching apparatus, comprising an inclined trough divided into a plurality of compartments by hollow partitions which extend upwardly from the bottom of said trough but terminate short of the top thereof so that said compartments intercommunicate over the tops of said partitions, and agitating and conveying means in said trough, each of said hollow partitions comprising two spaced vertical walls, one of which is relatively imperforate, having but a single large aperture adjacent its bottom and the other of which is perforated throughout, a roof, and an overflow wall within the partition spaced from the first mentioned walls with an overflow space between its upper edge and said roof.

2. Leaching apparatus as set forth in claim 1, in which the roof of each hollow partition is inclined through substantially its entire length and in which the overflow wall is provided adjacent its bottom with a discharge opening closed by a gate.

3. Leaching apparatus as set forth in claim 1, including means in each of said hollow partitions between relatively imperforate and overflow walls for guiding the liquid flowing over the overflow wall to the aperture adjacent the bottom of said relatively imperforate wall.

4. An apparatus according to claim 1, said aperture being wedge shaped.

5. Leaching apparatus as set forth in claim 1, including means in each of said hollow partitions between the relatively imperforate and overflow walls for guiding the liquid flowing over the overflow wall to the aperture adjacent the bottom of said relatively imperforate wall, the last means including steep walls aligned with the aperture in the relatively imperforate wall.

In testimony whereof I affix my signature.

WALTER RAABE.